UNITED STATES PATENT OFFICE.

FRANK BUTLER JONES, OF LONDON, AND ERNEST BURY, OF YORKSHIRE, ENGLAND, ASSIGNORS TO MINERALS SEPARATION NORTH AMERICAN CORPORATION, OF NEW YORK, N. Y.

PROCESS OF PURIFYING LIQUORS BY FROTH FLOTATION.

1,388,868.  Specification of Letters Patent.  Patented Aug. 30, 1921.

No Drawing.  Application filed February 26, 1921. Serial No. 447,941.

*To all whom it may concern:*

Be it known that we, FRANK BUTLER JONES, a subject of the King of England, residing at London, in England, and ERNEST BURY, a subject of the King of England, residing at Yorkshire, in England, have invented certain new and useful Improvements in Processes of Purifying Liquors by Froth Flotation, of which the following is a specification, and for which we have filed an application in Great Britain, No. 4,988, filed Feb. 18, 1920.

The air-froth flotation process of concentration has been applied to the treatment of coal. At one works where this is being done, coal is distilled in the well-known way for the production of tar, ammonia, coal gas, and coke. The coal gas, after the removal of tar and ammonia therefrom, is passed through a scrubber supplied with sea-water which removes from the coal gas a number of organic substances, such as cresol, sulfocresols, naphthalene, etc. etc. in solution, emulsion, or suspension. These liquors are poisonous to fish life, and have on this account caused serious trouble all over the country, resulting from the common practice of discharging them into rivers or into the sea.

Experiments have been made using this residual liquor in the froth-flotation process of coal treatment, and it has been found that the residual liquor affords an excellent frothing agent for the recovery of coal.

At another gas works the coal gas, after removal of tar and ammonia, was passed through a scrubber supplied with fresh water, and objection was raised to the discharge of the scrubbing liquor into the sea. Experiments were made with the object of removing the organic constituents from the liquor, and it was found that if the liquor was subjected to froth-flotation treatment in the presence of a small proportion of a carbonaceous material, such as lamp black, finely powdered coke or coal, an effective froth was produced which contained the carbonaceous material and also the organic material from the effluent.

According to this invention a froth-flotation process is applied to a liquor which contains organic materials, such as those obtained by the scrubbing of coal gas, and which also contains, or to which is added, finely divided carbonaceous matter in suspension, so as to recover the carbonaceous matter and the organic materials in the froth, thereby separating them from the liquor and from any gangue or the like which is not included in the froth.

Further, according to this invention, a process for the recovery of carbonaceous substances, such as coal, from materials containing them consists in submitting such substances to froth-flotation in the presence of a liquor which contains organic materials, such as those obtained by the scrubbing of gas obtained by the destructive distillation of carbonaceous materials (such as ordinary coal gas), so as to produce a froth which not only contains the coal or like carbonaceous substances, but also contains the organic materials from the liquor.

According to this invention the liquor may be that which is obtained by the scrubbing of coal gas with sea-water.

In order to obtain a recovery of the highly carbonaceous shales (or "bone-coal" as they are sometimes called) it may be found advisable to add to the liquor a small quantity of paraffin, *i. e.* kerosene oil (say one fifth to one tenth of a pound per ton of crude coal treated).

An example illustrating this feature of the invention is as follows:—

Coal from West Beechburn colliery in the north of England, was crushed to pass a screen of one tenth inch aperture and made into a pulp with the effluent obtained from the scrubbing of coal gas with sea-water in the proportion of one part of coal to four parts of effluent. The raw coal contained 24.2% of ash. This pulp was then treated in a flotation machine of the circulating type without any addition of reagents beyond those already contained in the gas scrubbing effluent. A product was separated in the form of a froth weighing 66.6% of the raw coal and assaying 5.2% of ash. An addition of two thirds of a pound of paraffin per ton of raw coal was then made and the process continued when a second froth of "bone-coal" was separated, weighing 6% of the raw coal and assaying 14.7% of ash. The residue from the treatment contained 27.4% of the weight of the raw coal and assayed 78.4% of ash.

It has also been found that the effluent can, with advantage, be diluted by the addition thereto of an equal quantity of sea-water.

The liquor may also be that obtained by the scrubbing of coal gas with fresh water.

An example illustrating this modification of the invention is as follows:—

The coal was a mixture of coking coals from two Durham collieries. The mixture contained 24.1% of ash. 1200 grams were ground to pass through one-tenth inch aperture, and were concentrated by froth-flotation in a fresh water circuit in the form of a 7:1 pulp. The frothing agent used was the waste liquor obtained by scrubbing coke oven gas with fresh water. This liquor was added in the proportion of one part of waste liquor to nine parts of fresh water, and on agitating and aerating the pulp, the concentrate produced contained 4.1% of ash, and its weight amounted to 65.3% of the coal treated. The residue contained 64.2% of ash.

What we claim as our invention and desire to secure by Letters Patent is:—

1. The process of treating a liquid which consists in agitating and aerating a liquor containing organic matter derived from the scrubbing of gas obtained from coal and containing finely divided carbonaceous matter and thereby producing a froth containing said organic matter and carbonaceous matter, and separating said froth.

2. The process of treating a liquid which consists in adding finely divided carbonaceous matter adapted to be held in suspension to a liquor containing organic matter derived from the scrubbing of gas obtained from coal, agitating and aerating the mixture to produce a froth containing said organic matter and carbonaceous matter, and separating the froth.

3. The process of treating a liquid which consists in adding finely divided coal adapted to be held in suspension to a liquor containing organic matter derived from the scrubbing of gas obtained from coal, agitating and aerating the mixture to produce a froth containing said organic matter and finely divided coal, and separating the froth.

4. The process of treating a liquid which consists in adding carbonaceous matter suitable to form a pulp to a liquor containing organic matter derived from the scrubbing of gas obtained from coal, agitating and aerating the pulp to produce a froth containing the organic matter and carbonaceous matter, and separating the froth.

5. The process of treating a liquid which consists in adding coal suitably ground to form a pulp to a liquor containing organic matter derived from the scrubbing of gas obtained from coal, agitating and aerating the pulp to form a froth containing said organic matter and ground coal, and separating the froth.

6. The process of removing organic material from a liquor containing it, which consists in mixing with the liquor suitably ground coal to form a pulp, agitating and aerating the pulp to form a froth, separating the froth, adding to the pulp so treated a mineral oil, agitating and aerating to form a second froth, and separating the second froth.

7. The process of removing organic material from a liquor containing it, which consists in mixing with the liquor suitably ground coal to form a pulp, agitating and aerating the pulp to form a froth, separating the froth, adding to the liquor so treated an oily liquid agitating and aerating to form a second froth, and separating the second froth.

8. The process of treatment of the effluent obtained from the scrubbing of gas produced by the distillation of carbonaceous materials consisting in adding thereto finely divided carbonaceous matter adapted to be held in suspension, agitating and aerating the mixture to produce a froth in which are recovered the carbonaceous matter and organic materials contained in the effluent, separating the froth, adding an oily liquid to the pulp, and agitating and aerating to produce a second froth.

9. The process of treating a liquid which consists in adding carbonaceous material suitably ground to form a pulp to a liquor containing organic matter derived from the scrubbing of gas obtained from coal, also adding an oily liquid, agitating and aerating the pulp to produce a froth containing the organic matter and carbonaceous matter, and separating the froth.

10. The process of treating a liquid which consists in adding coal suitably ground to form a froth to a liquor containing organic matter derived from the scrubbing of gas obtained from coal, also adding an oily liquid, agitating and aerating the pulp to produce froth containing the organic matter and ground coal, and separating the froth.

11. The process of treating a liquid which consists in adding a small quantity of an oily liquid to a liquor containing organic matter derived from the scrubbing of gas obtained from coal and containing finely divided carbonaceous matter held in suspension, agitating and aerating the mixture to form a froth containing said organic matter and carbonaceous matter, and separating the froth.

In testimony whereof we have signed our names to this specification in the presence of two subscribing witnesses.

FRANK BUTLER JONES.
ERNEST BURY.

Witnesses:
W. J. WALTON,
J. PHILLIPS HAWLEY,
A. E. MITCHELL,
ERNEST PARSONS.